Oct. 9, 1945.　　　　T. R. GRIFFITH　　　　2,386,212
COMPOSITE ARTICLE AND METHOD OF BONDING RUBBER TO A CORRODIBLE MATERIAL
Filed Jan. 3, 1940
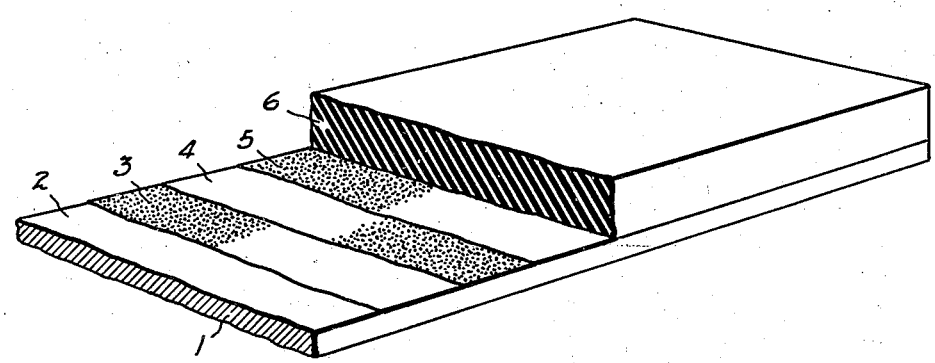
INVENTOR
Thomas R. Griffith
BY
Evans + McCoy
ATTORNEYS Patented Oct. 9, 1945

2,386,212

UNITED STATES PATENT OFFICE 2,386,212

COMPOSITE ARTICLE AND METHOD OF BONDING RUBBER TO A CORRODIBLE MATERIAL

Thomas Raymond Griffith, Ottawa, Ontario, Canada, assignor to The Honorary Advisory Council for Scientific and Industrial Research, Ottawa, Ontario, Canada, a corporation of the Dominion of Canada Application January 3, 1940, Serial No. 312,301

9 Claims. (Cl. 154—2)

This invention relates to the production of composite articles of rubber and a solid material, and particularly to the bonding of rubber to metals that are subject to attack by ingredients of the rubber compound especially during vulcanization of the rubber compound.

This invention is valuable in connection with the bonding of rubber to bronze to make composite articles.

In the preparation of composite articles having rubber firmly secured to metal, the metal is coated with a thin coat of a suitable rubber to metal adhesive, such as for example, a solution of a rubber derivative or rubber conversion product having adhesive properties. A vulcanizable rubber composition is then superimposed on the coated metal and the assembly subjected to heat and pressure to vulcanize the rubber composition and to unite the component parts of the article.

During vulcanization sulphur may migrate from the rubber composition through the adhesive coating on the metal and chemically react with certain metals, such as bronze, so as to greatly weaken the bond between the adhesive and the metal.

It is an object of this invention to provide a method for obtaining a strong bond between rubber and metals which are readily corrodible by sulphur or other migratory ingredients from the rubber compound at vulcanizing temperatures.

It is another object of this invention to provide a composite article having rubber firmly united to a material, such as bronze and the like.

It is a further object of this invention to provide composite articles and a method for making composite articles of rubber and rigid materials that may be attacked by migratory constituents of the rubber compound where these constituents are prevented from coming into contact with the said rigid materials by a barrier contained in an adhesive coating which is applied in close proximity to or on the surface of the rigid material.

Another object of this invention is to provide a method for making composite articles of rubber and metals, such as bronze, wherein a cement may be applied to form a comparatively thin but effective barrier against sulphur.

Other objects will be apparent from the following detailed description of the method and of the drawing, which illustrates a composite article having rubber firmly attached to a rigid material, such as bronze, which at vulcanizing temperatures is corroded by migratory ingredients of the rubber composition.

It has been heretofore proposed to prevent sulphur from coming in contact with the rubber to metal adhesive and the surface of metals corrodible by sulphur. The proposed methods consist essentially in interposing between the vulcanizable rubber and the rubber to metal adhesive a calendered layer of rubber having in some cases finely divided solid materials dispersed therein, but having no vulcanizing ingredients such as sulphur present.

It has now been found that a very strong bond between rubber and a corrodible metal, such as bronze, may be produced when flaky materials, such as aluminum flakes, talc, mica, etc., are combined with a suitable adhesive solution and the adhesive applied in a normal manner. If there are substances in the rubber to be bonded, which at any temperature may migrate and corrode or deleteriously affect the metal or other material, the barrier may be used to prevent the corroding substance from coming into contact with the metal to be bonded to the rubber.

The composite articles according to this invention are prepared by coating the metals directly with a rubber to metal adhesive containing a flaky solid material which is preferably a metal flake, such as aluminum flake. Several layers of the rubber to metal adhesive may be applied. Preferably, the metal is successively coated with one or more coats of a relatively hard rubber derivative or rubber conversion product, one or more coats of a relatively softer rubber derivative or rubber conversion product, and a coating of a suitable type of tie cement, each coat being allowed to dry before the next is applied. The vulcanizable rubber compound is then superimposed upon the coats of adhesive and vulcanized with heat and pressure.

The rubber to metal adhesive is preferably a rubber derivative or a rubber reaction product having less plasticity than rubber at temperatures around 120° C. It may be prepared as set forth and as disclosed in my prior applications, Serial No. 277,086 filed June 2, 1939, and Serial No. 292,699 filed August 30, 1939.

As there set forth, the rubber derivatives or rubber conversion products are prepared by forming a homogeneous mixture of a suitable rubber conversion reagent and rubber, with or without sulphur in an amount up to 3% or so, then sheeting the mixture into relatively thin sheets, such as 5 mm. thickness or less, heating the sheets preferably in a vacuum to secure a reaction product, and masticating the product to render it soluble.

The rubber conversion reagent may be composed of a salt of a strong acid and a weakly acidic substance, both of which are preferably in solid form, and one of which contains considerable water of hydration. The sulfates, and particularly the acid sulfates or double sulfates, are preferred as the salt of a strong acid, especially when they contain considerable water of hydration. The weakly acidic ingredient of the conversion reagent is preferably a substance such as phosphorus pentoxide or phosphorus pentachloride, which with water forms a weak acid. Aluminum acid sulfate when properly used with a suitable cooperating material of the character of phosphoric acid, produces rubber reaction products having exceptionally desirable properties for use both as an adhesive and as a base for paint.

Examples of the acid sulfates or double sulfates which are particularly desirable for use are those of aluminum, iron, both ferric and ferrous, the alkali metals including ammonia, alkaline earth metals, and a closely related aluminum potassium alum and other alums. In addition to the acid sulfates other sulfates may be used. Examples of these are sulfates of iron, aluminum, copper, mercury, and cadmium. Examples of salts of strong acids other than sulphuric acid are bromides, mercury and zinc, chlorides of mercury and aluminum, and alkali metal iodide. Phosphoric acid is a very good example of a weakly acidic substance and is desirable for use in forming the rubber conversion product heretofore mentioned. For some uses, where it is desirable to have a conversion product somewhat more soluble in rubber solvents, oxalic acid had been used advantageously. Other weak acids that are also desirable for use are benzoic, tartaric, phthalic, and salicylic. The particular acid may be selected for the properties it gives to the conversion product and various acids seem to impart slightly different properties.

Up to about 3% of sulphur may be added during the preparation of the rubber derivative and prior to the reaction to produce a soluble adhesive having less than about 3% of combined sulphur. The adhesive thus prepared has superior properties and is an excellent rubber to metal adhesive. Other vulcanizing elements such as selenium and tellurium may be used.

The flaky material, such for example as aluminum flake, talc, or mica, is preferably combined with the solvent or with solutions of the rubber conversion product. The flakes are preferably added to the solvent or a solution of the adhesive, for if the flaky material be masticated or milled into the rubberlike material, a large proportion of the flakes may be broken or displaced so as to lose a great deal of their effectiveness as a barrier.

It is usually preferable in providing a flaky material to serve as a barrier to use metallic flakes, preferably aluminum flakes, because metallic flakes are not likely to be fractured, they seem to be very effective as a barrier, and the adhesive adheres well to them. Other flakes, such as those of talc, mica, etc., may be used, however, and they also provide a suitable barrier.

When films containing flaky material are deposited from a solution, the orientation of the major dimensions of substantially all the flakes is found to be substantially parallel to the surface on which the coat of solution has been applied, whereas when the barrier layer is prepared from sheeted solid material into which flakes have been incorporated, any flakes that may remain unfolded are distributed more or less at random. The effectiveness of the barrier is therefore considerably improved when the films containing flaky material are deposited from solution.

The quantity of flaky material added to the rubber conversion product depends upon the character and leafing properties of the flaky material used, and with flaky material in which the ratio of thickness to surface area is smaller, the same results may be obtained with a less amount of the flaky material, especially when such materials have higher leafing ability. The quantity of flaky materials added should, however, preferably be insufficient to cause a substantial reduction in the strength of the adhesive film. When aluminum flake is used, about 60 to about 80 or 100 parts of this flake to 100 parts of adhesive base is the preferred quantity.

In the preparation of rubber and corrodible metal assemblies, according to this invention the metal 1, which may be bronze or other easily sulphur corrodible material, having a clean surface 2, which may be prepared by sand blasting or by other suitable means, is coated with one or more coats of a solution of relatively hard rubber reaction product, or rubber derivative containing sulphur in combination to form the layer 3 on the surface of the metal 2. After the film 3 containing flaky material has dried, one or more coats of a relatively softer rubber derivative or rubber conversion product is superimposed on the layer 3 to form a comparatively thin film 4.

The relatively harder and softer rubber derivatives or rubber conversion products are prepared by incorporating larger or smaller amounts, respectively, of rubber conversion reagent into the rubber prior to the reaction. Also, the harder and softer rubber derivatives may be prepared by heating a given mix of rubber and conversion reagent for longer or shorter periods of time, respectively. The solution of harder rubber to metal adhesive used for the layer 3 on the surface of the metal contains a substantial proportion of flaky solid material, such as aluminum flake, the parallel surfaces of which are orientated substantially parallel to the surface 2, so as to form an effective barrier against the sulphur of the rubber.

In some instances it is desirable to use a rubber derivative of intermediate hardness, which preferably contains the flaky material, and to apply a single coat in place of the coats of hard and soft rubber derivatives just described.

The vulcanizable rubber composition 6 may be applied directly to the soft derivative 4 and the assembly heated to vulcanize the rubber to produce a composite article, but it is preferred to apply a layer of suitable rubber containing cement or tie gum between the rubber composition 6 and the film 4. This cement 5 may contain a suitable amount of powdered solids, such as zinc oxide, or short fibrous material, such as short fibre asbestos. A suitable tie cement may be formed by mixing 100 parts of rubber with suitable compounding ingredients, such as 40 parts of carbon black, 20 parts of short fibre asbestos, 1.25 parts of stearic acid, 5 parts of zinc oxide, with or without vulcanizing agents and antioxidants, and dissolving the compounded rubber in a suitable solvent. If desired, one may use part rubber and part rubber conversion product in making the tie cement.

During the vulcanization of the vulcanizable rubber composition 6, sufficient pressure should be applied to the composition to hold it firmly in contact with the top layer of the adhesive or cement. It is preferable that the assembly be inserted into a mold, wherein the rubber is pressed against the metal with considerable force.

The following examples illustrate the preparation of a composite article of rubber and bronze according to the method of this invention.

Example I

| | Parts |
|---|---|
| Pale crepe rubber | 100 |
| Aluminum acid sulfate | 18 |
| Phosphorus pentoxide | 4.5 |
| Sulphur | 3 |
| Water | 2 |

These ingredients were thoroughly mixed together on a rubber mill and sheeted out to a thickness of 2 or 3 mm. The sheets were then heated on perforated trays in a vacuum oven for 2 hours at 150° C. The material, which is a relatively hard rubber derivative containing combined sulphur, was solubilized by milling for a proper period and then dissolved in proper solvents to produce an adhesive. During the solubilization period, 10 parts of zinc oxide and 2 parts of an antioxidant were added in this case. The zinc oxide was added as soon as possible after the start of the milling to be certain that any reactive acid material that might be present was immediately neutralized.

Example II

| | Parts |
|---|---|
| Rubber | 100 |
| Aluminum acid sulfate | 7 |
| Phosphorus pentoxide | 2 |
| Sulphur | 1 |
| Water | 1 |

These ingredients were mixed and sheeted as in Example I. The aluminum acid sulfate and the phosphorus pentoxide are preferably added to the rubber in master batch form and the water incorporated last. The material was sheeted to a thickness of 2 or 3 mm., and the relatively thin sheets were heated for about 90 minutes at 150° C. in a vacuum oven, and then masticated to render them soluble. During the mastication they were compounded with 80 parts of zinc oxide and 2 parts of an antioxidant, the zinc oxide being added as soon as possible for the above mentioned reasons. The material of this example is substantially softer than that of Example I.

A sample of sand blasted bronze was coated successively with solutions in benzene of adhesive of Example I and the adhesive of Example II, and the rubber containing cement above, each coat being allowed to dry before the next was applied. The adhesive of Example I also contained 80 parts of aluminum flake to each 100 parts of the solid rubber derivative. The aluminum flake was not masticated with the solid adhesive base and was incorporated with the liquid. The coated assembly was then placed in contact with vulcanizable rubber and the assembly heated in a suitable mold under pressure. The assembly was removed from the hot mold and when tested the strength of the bond was sufficient to cause rupture in the rubber when an attempt was made to separate the components.

The adhesives prepared with the conversion reagents and in the manner set forth above are less thermoplastic than rubber at temperatures of the order of 120° C. They have the same carbon to hydrogen ratio as rubber and are less chemically unsaturated than rubber, with equivalent amounts of any combined added elements. Although in the above example the flaky material was added in the adhesive applied on the metal surface, as has been found to be preferable, commercial results may also be obtained when the flaky material is incorporated in the relatively softer rubber to metal adhesive such as that set forth in Example II. In such a case, however, the quantity of non-flaky added pigments should be considerably reduced. In some cases it might be found advantageous to incorporate flaky material in the rubber containing cement or in each of the layers interposed between the vulcanizable rubber composition and the metal. The results, however, are inferior when the flaky material does not adhere firmly to the material of the surrounding film. If it be desired to incorporate the metal flakes in a rubber cement not containing an adhesive, the metal flakes may be first coated with a suitable adhesive.

When the flaky material is added to the rubber to metal adhesive, it has been found that a very thin layer will ordinarily provide adequate protection from any transferred sulfur. In any case, however, it will be found that a relatively thinner layer may be used when the flaky material is applied in a cement, as in such cases the flaky material appears to remain flat with the largest dimensions parallel to the surface of the metal, whereas when a calender strip rubber compound, such as a suitable tie gum containing flaky material, is added to the rubber to metal adhesive, the flaky material tends to remain therein at various angles to the metal surface, and the effect of the barrier is accordingly very much reduced.

While this invention relates particularly to the formation of composite articles of rubber and bronze, or rubber and other similar corrodible metal, flaky materials such as those mentioned above may be added to the adhesive and/or tie cement in the preparation of composite articles having a rubber or a rubber-like material, such as synthetic rubber, bonded to various surfaces other than corrodible metal in order that the flaky material may prevent migration of some undesirable material from the rubber into the adhesive used, or into contact with the other material. Thus, for example, the barrier may be used to prevent migration of harmful accelerators, etc. in certain rubber compounds into the rubber to metal adhesive used. Also the barrier above described may be useful for preventing the migration of some injurious compound in the rubber which is to be bonded to fabric, etc.

While a particular type of rubber derivative has been described as the adhesive used in the practice of this invention, other adhesives that will cause adhesion between rubber and metal may be used.

While the examples above have been limited to the bonding of natural rubber compounds to metal, the process of this invention is also applicable for the adhesion of various synthetic rubbers to metal, and it is therefore intended that the rubber compounds attached to other solids be interpreted to include synthetic rubber compounds as well as natural rubber compounds.

It is apparent in accordance with the well known migration of sulfur in rubber that when a tie cement, or a cement containing rubber, is applied over the rubber-to-metal adhesive or on the curable rubber compound, even though the resultant thin film of cement may contain no sulfur when first applied, the sulfur from the contacting curable rubber compound will readily migrate into the thin film so that a rubber compound containing sulfur is in contact with the rubber-to-metal adhesive.

Various modifications may be made in the above described process without departing from the spirit thereof as herein set forth, and is not intended to limit the appended claims except as may be necessitated by the prior art.

What I claim is:

1. In a process for producing composite articles of rubber and metal, wherein a rubber compound is firmly adhered to a metal which under vulcanizing conditions is easily attacked by ingredients of the rubber compound, the steps which comprise forming a film containing flaky material by applying to the surface of the metal an organic adhesive solution containing a rubber conversion product and having a flaky, inorganic solid material therein, which flaky solid material remains chemically and physically inactive at vulcanizing temperatures, disposing a curable compounded rubber in contact with the rubber conversion product film and curing the rubber of said compound whereby it strongly adheres to said metal, said conversion product having the carbon to hydrogen ratio of rubber and being a rubber conversion product prepared by mixing a suitable rubber conversion reagent with rubber, sheeting the mixture into thin sheets of less than about 5 mm. thickness, heating the sheets to secure a reaction product and solubilizing the product, the amounts of harmful ingredients in said film being insufficient to harmfully attack the metal and said solid being of a type which is insoluble in said layer.

2. In a process for producing composite articles of a rubber compound containing sulfur and a sulphur corrodible metal, the steps which comprise forming a film containing flaky material by applying between the rubber and the metal an adhesive solution of a rubber conversion product containing a solid, flaky material which remains solid in rubber at vulcanizing temperatures, the amounts of any harmful ingredients in said film itself and between said film and the metal being insufficient to cause undesirable corrosion of said metal, and curing a rubber compound containing sulphur in contact with said adhesive film whereby a strongly bonded article having rubber attached to metal is produced, said conversion product having less plasticity than rubber at 120° C., and being the reaction product in thin section not substantially more than 5 mm. in thickness of a solid mix consisting essentially of rubber and a cyclizing agent for rubber, the amount of flaky material in said film being insufficient to prevent adhesion of rubber thereto.

3. In a process for producing composite articles of a rubber compound containing sulfur and a sulphur corrodible metal, the steps which comprise forming a film of adhesive containing a flaky material between the rubber compound and the metal by disposing between the rubber and the metal an adhesive solution of a rubber conversion product containing a solid, inorganic, flaky material which remains solid in rubber at vulcanizing temperatures, disposing a rubber compound containing sulfur in contact with the film of adhesive and curing the rubber of the compound, said adhesive film itself and any composition between said film and the metal having no harmful corrosive effect on the metal, said rubber conversion product having the property of adhering rubber to metal and being a rubber conversion product prepared by mixing a water-soluble salt of a strong acid and water into rubber, forming the mixture into a form having a section of less than about 5 mm. thickness, heating the sheets to secure an exothermal reaction product and solubilizing the product, the amount of flaky material in said film being insufficient to prevent adhesion of rubber thereto.

4. In a process for producing composite articles wherein a rubber compound containing sulfur is firmly bonded to a sulphur corrodible metal, the steps which comprise disposing over the metal surface to be joined to the rubber, a rubber-to-metal adhesive of liquid consistency containing a substantial proportion of a flaky metal to form a film of rubber-to-metal adhesive having flaky metal therein, disposing the curable compounded rubber containing sulfur in contact with said rubber-to-metal adhesive and curing the rubber, whereby the rubber is thoroughly bonded to said metal, said film itself and any sustance between it and the metal having no harmful corrosive effect on the metal, the amount of flaky material in said film being insufficient to prevent adhesion of rubber thereto.

5. In a process for producing composite articles wherein rubber containing sulfur is firmly bonded to a sulphur corrodible metal, the steps which comprise forming a film containing a solid flaky material between the surfaces to be united by applying on a surface of the metal to be united to rubber a solution of a rubber-to-metal adhesive containing a substantial proportion of aluminum flakes, disposing a rubber compound containing sulfur in contact with said adhesive and curing the rubber of the compound whereby the rubber is strongly bonded to said adhesive and to said metal, said film itself and any materials between said film and the metal having no harmful corrosive effect on said metal, the amount of flaky material in said film being insufficient to prevent adhesion of rubber thereto.

6. A strongly bonded composite article having a rubber compound containing sulfur firmly attached to a sulphur corrodible metal through an adhesive film containing a solid, inorganic flaky material, which film was deposited from a liquid containing a substantial amount of a solid, inorganic flaky material, said film itself and films between it and the surface of the metal being not harmfully corrosive to said metal, said rubber compound containing sulfur being in contact with said adhesive film, said solid flaky material being solid at vulcanizing temperatures, the amount of flaky material in said film being insufficient to prevent adhesion of rubber thereto.

7. A composite article comprising a sulphur corrodible metal, a film of rubber-to-metal adhesive on said metal, said film containing a substantial proportion of aluminum flakes and being a film deposited on metal from a dispersion of a rubber-to-metal adhesive containing a substantial proportion of said aluminum flakes therein, said film itself and any materials between it and said corrodible metal being not harmfully corrosive to said corrodible metal and a cured rubber compound containing sulfur in contact with the rubber-to-metal adhesive and strongly bonded through said adhesive to said metal, the amount of flaky material in said film being insufficient to prevent adhesion of rubber thereto.

8. A strongly bonded composite article having a rubber compound containing sulfur firmly attached to a sulfur corrodible metal through an adhesive film containing mica flakes, which film was deposited from a liquid containing a substantial amount of mica flakes, said film itself and films between it and the surface of the metal being not harmfully corrosive to said metal, said rubber compound containing sulfur being in contact with said adhesive film, the amount of flaky material in said film being insufficient to prevent adhesion of rubber thereto.

9. A composite article comprising a sulphur corrodible metal, a film of rubber-to-metal adhesive on said metal, said film containing a substantial proportion of a flaky metal and being a film deposited on metal from a dispersion of a rubber-to-metal adhesive containing a substantial proportion of said flaky metal therein, and a cured rubber compound containing sulfur in contact with the rubber-to-metal adhesive and strongly bonded through said adhesive to said corrosive metal, the amount of flaky material in said film being insufficient to prevent adhesion of rubber thereto.

THOMAS RAYMOND GRIFFITH.